July 24, 1956 — H. WEISSINGER — 2,756,359
BRUSH AND HOLDER FOR ELECTRIC MACHINES
Filed Feb. 2, 1954 — 2 Sheets-Sheet 1
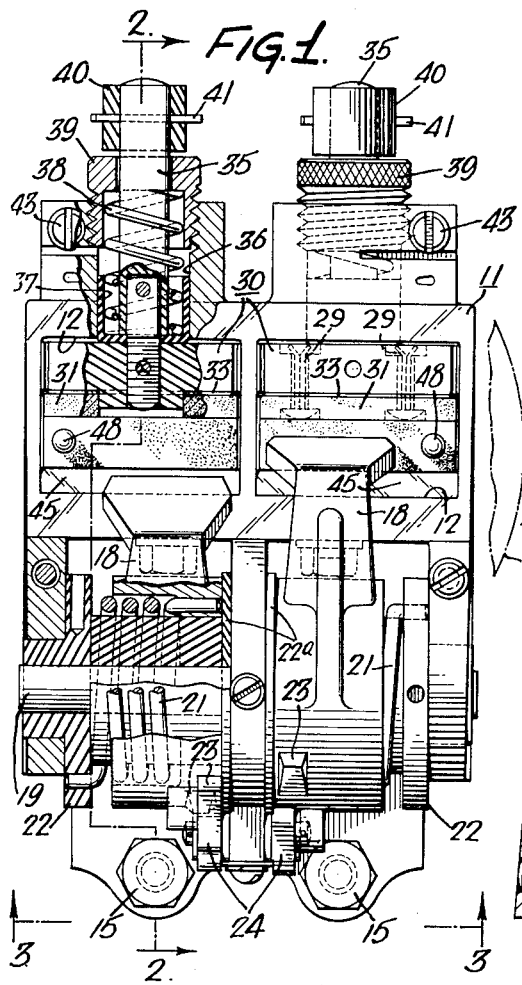
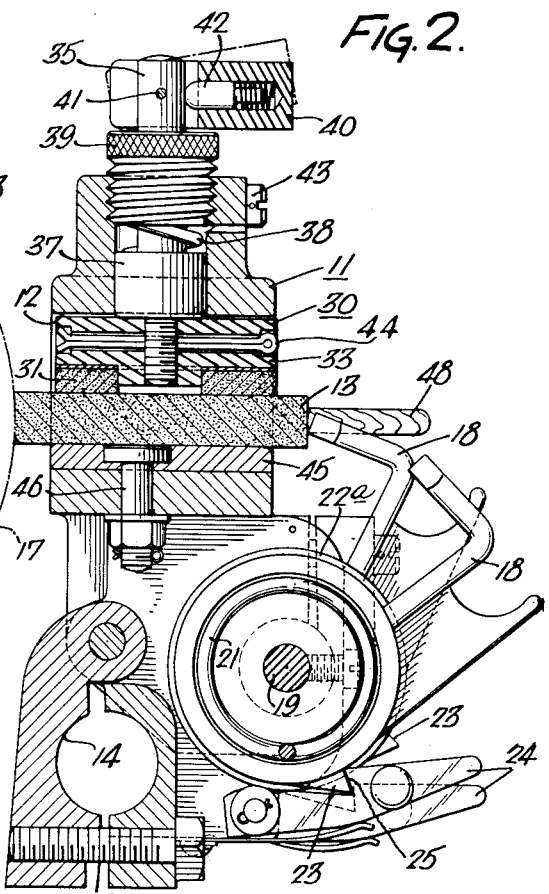
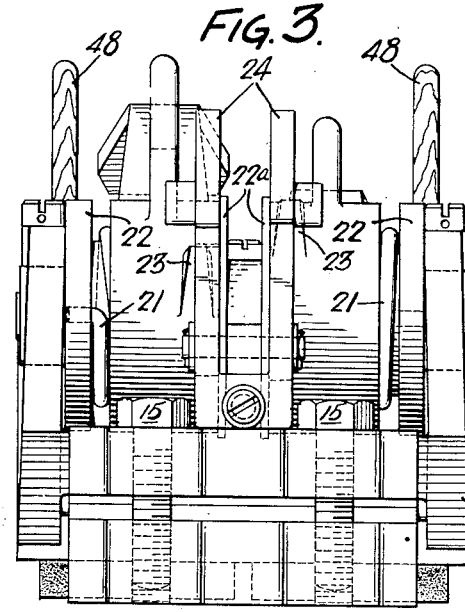
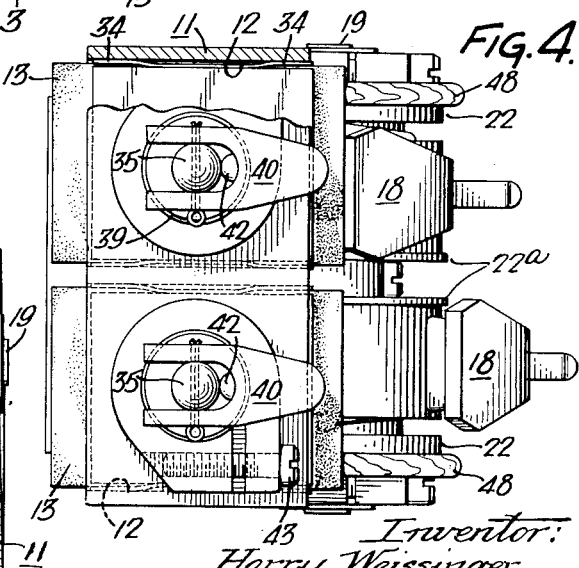
Inventor:
Harry Weissinger
By Howson & Howson
ATTYS.

July 24, 1956
H. WEISSINGER
2,756,359
BRUSH AND HOLDER FOR ELECTRIC MACHINES
Filed Feb. 2, 1954
2 Sheets-Sheet 2
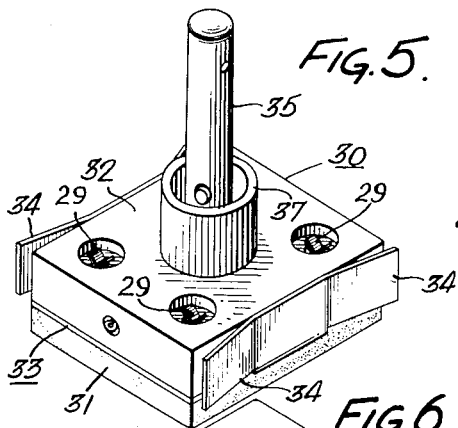
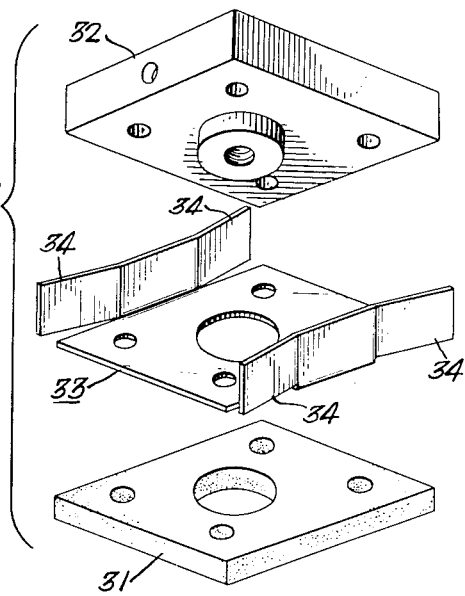
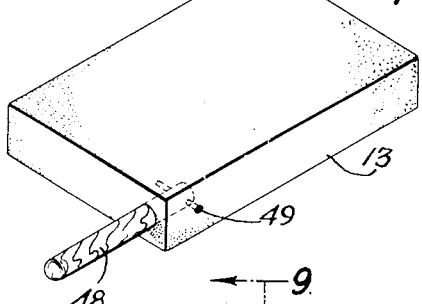
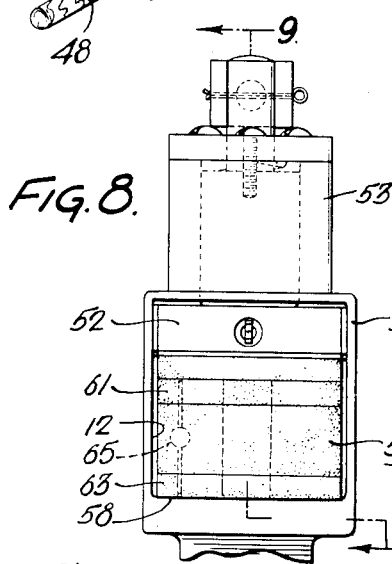
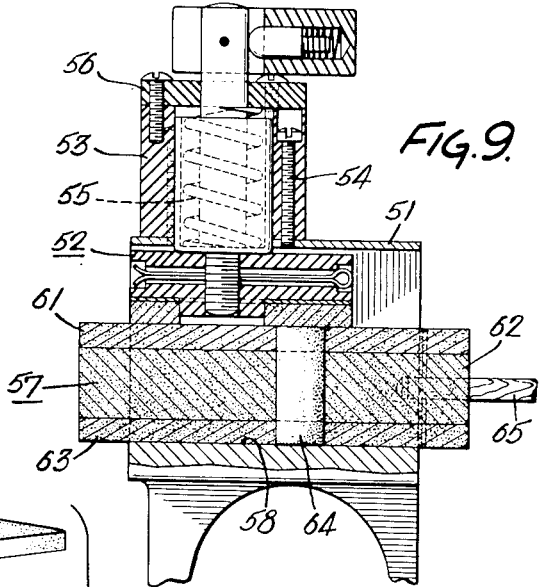
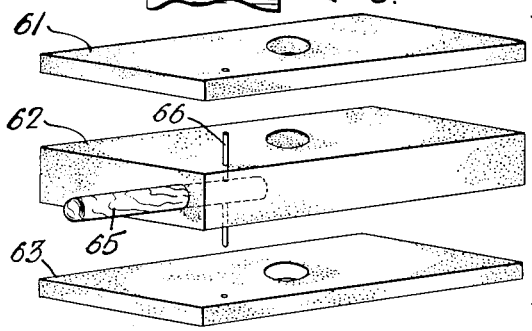
Inventor:
Harry Weissinger
BY Howson & Howson
ATTYS.

United States Patent Office 2,756,359
Patented July 24, 1956

2,756,359

BRUSH AND HOLDER FOR ELECTRIC MACHINES

Harry Weissinger, Philadelphia, Pa.

Application February 2, 1954, Serial No. 407,740

9 Claims. (Cl. 310—246)

The present invention relates to a brush and holder for electrical machines, and has particular application to electric motors and generators.

Prior brush holders of this type comprise a box or housing for the brush and a spring-biased pivoted lever for urging the brush into contact with the rotary contact surface of the electrical machine, such as disclosed in my patent, No. 2,277,572, dated March 24, 1942. The electrical contact between the brush and the housing comprises a flexible lead mounted at one end on the casing and at the other end on the pigtail of the brush. The conventional brush holder is satisfactory for normal usage but in installations subject to extreme vibrations and other harsh operating conditions, the brush has a tendency to wear and become loose in the housing thereby causing vibration of the brush and variation in the contact between the brush and the rotary contact member. If this condition is allowed to continue, the housing becomes worn and the contact of the brush on the rotary contact surface becomes rounded, thus providing a line-contact rather than a surface contact. The result of this is that considerable resistance is introduced in the electrical circuit causing the brush to burn and generate carbon vapor accompanied, in some cases, by electrical flashover from one set of brush holders to the other thereby causing damage to the equipment. To correct this deficiency in the conventional brush holder, it is necessary to replace the complete assembly with one formed to the proper dimensions. This involves substantial cost and an increase in shut-down time for the machine.

In some installations, it has been found desirable to utilize a laminated brush in which the outer laminations are of a material having greater resistance than the internal laminations. The purpose of the varying characteristics is to reduce the internal electric circuits in the brush and the amount of short-circuiting current in the commutator bars and the brush during rotation of the commutator. The laminations of the brushes for conventional holders must be securely fastened together and are therefore relatively expensive to make and use.

With the foregoing in mind, a primary object of the present invention is to provide a brush holder in which direct electrical connection is made between the brush and the housing over wide contact areas of the same.

Another object of the present invention is to provide a brush holder in which replacement of the brushes and of the parts exposed to wear is made quickly and simply without substantial loss of time.

A further object is to provide a brush holder which affords the use of a laminated brush of greatly simplified construction free of rivets and similar fastening devices.

A still further object is to provide a brush having a handle element permitting ready removal and replacement of the brush and which also serves as a gage to determine when the brush is spent.

Still another object is to provide a brush housing which securely maintains the brush in proper position avoiding vibration so that a wide surface contact between the brush and the rotating contact element is maintained.

A still further object is to provide a brush holder of simple construction and which is not adversely affected by extreme mechanical vibrations.

These and other objects of the invention and the various features and details of the construction and operation thereof are more fully set forth hereinafter with reference to the accompanying drawings in which:

Fig. 1 is a plan view of the brush holder with certain parts broken away to illustrate the structural details thereof;

Fig. 2 is a sectional view taken on the line 2—2 of Fig. 1;

Fig. 3 is an end elevational view as seen from the line 3—3 of Fig. 1;

Fig. 4 is an end elevational view taken from the opposite end of Fig. 1 with a portion of the casing broken away to illustrate the electrical contact between the plunger member and the housing;

Fig. 5 is a detached perspective view of the plunger member;

Fig. 6 is a perspective view of the brush shown in Fig. 1;

Fig. 7 is an exploded perspective view of the body elements of the plunger member;

Fig. 8 is a fragmentary plan view of an alternate form of brush holder;

Fig. 9 is a sectional view taken on the line 9—9 of Fig. 8; and,

Fig. 10 is an exploded perspective view of the laminated brush shown in Figs. 8 and 9.

Referring now to the drawings, the embodiment of the invention illustrated in Figs. 1 to 5 inclusive is a heavy-duty brush holder such as used in rail cars, locomotives, cranes and like apparatus. The holder comprises a brush box or housing for the brush, a presser arm to urge the brush longitudinally into contact with the rotary contact surface and a plunger for urging the brush laterally into contact with the housing which is connected into the electrical system.

In the present instance, a brush box or housing 11 defines two open-ended compartments 12, 12, each adapted to slidably mount a carbon brush 13 therein. The housing 11 is formed of an electrically conductive material and is provided with a recess 14 for receiving a supporting bar or the like. The bar serves also as an electrical bus bar for taking power from or to the housing. A clamping screw is provided at 15 for making a solid connection between the housing and the supporting bar.

To insure proper contact between each brush 13 and the rotary contact surface 17, a presser foot lever 18 is pivotally mounted in the housing by means of a shaft, indicated at 19, of insulating material. Each foot lever is biased inwardly by a spring 21 which is adjustable in the casing by means of a rotatable bushing 22, likewise of insulating material. By rotatably adjusting the bushing 22, it is possible to regulate the bias on the foot 18 and therefore the pressure urging the brush 13 into contact with the rotary member 17. In addition, washers 22a of insulating material electrically insulate the levers 18 from the central partition of the casing. By making the shaft 19, bushings 22 and washers 22a of insulating material all current flow between the lever 18 and casing 11 normally is precluded.

Means is provided to retain the presser foot lever out of contact with the brush, for example when replacing the brush. As seen in Figs. 1 and 2, the barrel portion of each foot lever 18 is formed with a radially projecting lug 23. The lug is adapted to be engaged by a spring-biased latch member 24 having a notch 25 for engaging behind the lug 23. Thus, when the presser foot lever is pivoted away from the brush member, the lug 23 engages in the notch 25 to maintain the presser foot disengaged from the brush.

In accordance with the invention, means is provided to bias the brush laterally into firm contact with the housing. The lateral pressure affords longitudinal movement of the brush, but insures good electrical contact between the brush and the housing. The pressure is sufficient to prevent the usual lateral or angular movement of the brush within the housing which would cause uneven wear on the walls of the brush box as well as on the body of the brush and rocking movement of the brush on the rotary contact member. With the lateral pressure, however, the brush wears evenly, conforming to the contour of the contact member and maintaining full electrical contact across the entire end surface of the brush.

To provide the lateral pressure on the brush, a plunger member 30 is slidably mounted for slight axial movement against the brush 13 in each compartment 12 of the housing 11. As shown in Figs. 5 and 7, the plunger member 30 comprises a face plate 31 formed of carbon or other highly conductive material to provide good electrical contact between the brush and the plunger. A body member 32 of insulating material backs up the face plate 31 to lend additional support thereto. A foil element 33 is interposed between the body member 32 and the face plate 31 to insure electrical contact between the face plate 31 and the housing 11. To this end, the element is provided at its opposite sides with spring contact arms 34, 34. The arms 34, 34 (see Fig. 4) bear against the side walls of the housing 11 so as to insure proper electrical contact between the housing 11 and the face plate 31. Thus, the body portion of the plunger is free for limited movement in the housing while maintaining electrical contact between the face plate 31 and the housing. The body portion is assembled by suitable fastening means, for example rivets 29, so that when the face plate 31 becomes worn, it may be easily removed and replaced.

The plunger 30 is formed with a shaft 35 which is slidable within a bore 36 of the housing. The shaft is threaded into the body portion and is secured against displacement, for example by a cotter pin 44. A cup member 37 is mounted on the shaft 35 and is snugly received in the bore 36. The plunger is biased inwardly by a spring 38 seated at one end in the cup 37 and at the other end in a screw cap 39 threaded into the outer extremity of the bore. By adjusting the cap 39, it is possible to regulate the inward bias on the plunger. The cap 39 is locked in position by a screw 43. The spring 38 also automatically takes up any wear that may occur on the face plate 31. An operating lever 40 is pivoted to the shaft 35 as indicated at 41 and is operable when rocked outwardly to bear against the exposed surface of the cap 39 and relieve the bias on the plunger. To prevent rattling of the lever 40, and maintain the lever normally disengaged from the cap 39, a spring-biased detent is mounted in the lever as shown at 42 in Fig. 2.

In accordance with the invention, the plunger 30 constitutes one side wall of the compartment 12 for housing the brush 13. The opposite side wall comprises a wear plate 45 removably mounted in the compartment as indicated at 46. The wear plate is preferably of a highly conductive material so that current readily flows from the brush to the casing through the plate. The plunger 30 insures firm electrical contact over the whole surface of the wear plate.

In the operation of the brush and holder assembly, the compartment is loaded with a brush by rocking the presser foot lever 18 back until the lug 25 catches in the latch 24. This holds the presser foot lever out of the way as shown in Figs. 1 and 2. The operating lever 40 is then pivoted outwardly to displace the plunger 30 to its outer limit position. This enables a brush 13 to be placed in the compartment and into contact with the rotary contact element 17. The operating lever 40 is then released to bias the plunger 30 inwardly against the brush 13, and the latter against the wear plate 45. The bias on the plunger is regulated by the cap screw 39 so that the brush is held firmly against vibration under normal operating conditions and yet is free to slide longitudinally into contact with the member 17. The latch 24 is then released to urge the presser foot lever 18 into contact with the upper end of the brush 13. As pointed out above, the downward pressure on the brush is regulated by adjusting the bushing 22 in the housing. Thus, it is seen that the brush is constantly securely positioned laterally between the backing plate 45 and the face plate 31, and longitudinal between the rotary member 17 and the presser foot lever 18. Firm electrical contact is, therefore, provided between the member 17 and housing.

After a prolonged period of use, the brush 13 will gradually wear down at its lower end due to the sliding frictional engagement with the rotary member 17. Because of the firm grip the plunger exerts on the brush, chatter is eliminated and the wear at the end is uniform and the brush maintains conformity to the contour of the rotary member. Thus, a full surface contact is always provided between the rotary member and the brush. As the brush is worn away, it will be displaced longitudinally toward the rotary member under the bias of the presser foot lever 18.

When the brush is spent, it will be contained wholly within the compartment 13, and means is provided to afford ready removal of the brush when this condition arises. To this end, the brush is provided with a peg or rod 48 which is received in a socket in the brush and retained therein, for example, by a pin indicated at 49. The rod 48 not only affords ready removal of the brush from the compartment but also serves to indicate the amount of wear that has occurred. If desired, an indicating line or other indicia may be made on the rod to enable the maintenance men to ascertain at a glance when the brush should be replaced. To replace the brush, the lever 18 is rocked back until the lug 23 engages in the notch 25 of the latch 24. The opertaing lever 40 is then rocked outwardly to relieve the bias on the plunger 30 and the brush is removed by simply withdrawing it by means of the rod 48. A fresh brush may then be inserted into the compartment.

In Figs. 8 and 9, a modified brush holder is shown which is especially suitable for use in light-duty machines. In this embodiment, the housing comprises a brush box or housing 51 having mounted therein a plunger member 52 constructed similarly to the plunger member 30 described above. A sleeve 53 is mounted on the brush box as indicated at 54 to snugly receive the cup of the plunger. The spring 55 for biasing the plunger inwardly of the box seats at one end in the cup of the plunger and at the other end against a plate 56 secured to the outer end of the sleeve 53. The plate 56 serves the same purpose as the cap 39, but, of course, does not afford adjustment of the bias of the plunger. The plunger 52 bears against a brush 57 contained in the brush box 51 so as to securely position the brush between the plunger and the opposite side wall 58 of the brush box. A presser foot lever such as shown at 18 in the previous embodiment, is provided to bias the brush longitudinally inward against the rotary contact surface of the machine. The construction of the lever is identical to that described above and is not shown in Figs. 8 and 9.

As shown more particularly in Fig. 10, the brush 57 comprises a laminated construction to reduce internal currents built up in the brush during normal operating conditions. For example, while any number of laminations may be employed, Figs. 8 and 9 show a brush formed of three laminations 61, 62, and 63. The internal lamination 62 is of low resistance carbon whereas the outer laminations 61 and 63 are of greater resistance to reduce the possibility of short circuiting the adjacent commutator bars of the rotary contact member. A carbon pin 64 passes through the laminations and retains them against relative longitudinal displacement. The pin 64 also affords a direct connection between the internal lamination 62 and the end wall 58 and plunger 52 respectively. A gage rod 65 is mounted in the brush in generally the same manner and for the same purpose as the rod 48 of the previous embodiment. In this case, the retaining pin 66 extends through the several laminations 61, 62, and 63 and serves to maintain the laminations in their proper relative positions.

In accordance with the invention, the laminated brush requires no extraneous fastening elements, since the lateral pressure afforded by the brush holder maintains the laminations in intimate contact to provide proper electrical connection therebetween. The brush holder, therefore, affords a laminated brush of very simple construction and assembly which may be produced at minimum cost. It is to be understood that with slight modification of the holder disclosed in Figs. 1 to 7, the brush 57 may be substituted for the brush 13.

While particular embodiments of the invention have been herein illustrated and described, it is not intended to limit the invention to such disclosures, and changes and modifications may be made therein and thereto within the scope of the following claims.

I claim:

1. In a brush holder for electric machines, an open-ended brush box for receiving a brush for longitudinal sliding movement therein, said box being defined by opposed side walls, one of said walls being mounted for lateral movement inwardly of the box and comprising an electrical conductive face plate and conductive means connected to flush against said face plate in underlying relation thereto and having spring leaf elements disposed in slidable engagement with said brush box, the other of said walls being defined by a removable electrically conductive backing plate and means to secure said backing plate in position in said brush box to provide electrical connection therebetween, means to bias said movable wall towards the opposite wall to securely position the brush against lateral and angular displacement between said opposed side walls, and means to engage and bias the brush longitudinally through said box in a direction perpendicular to said side wall bias.

2. In a brush holder for electric machines, an open-ended brush box for receiving a brush for longitudinal sliding movement therein, said box being defined by opposed side walls, a plunger having a shaft snugly mounted in said box for axial sliding movement transversely of said box and having a body portion defining one of said opposed side walls for engaging the brush, and spring means seated at one end against said brush box and at the other end against said plunger to bias the latter inwardly to securely position the brush against lateral and angular movement between said body portion and the opposite side walls.

3. In a brush holder for electric machines, an open-ended brush box for receiving a brush for longitudinal sliding movement therein, said box being defined by opposed side walls, a plunger having a shaft snugly mounted in said box for axial sliding movement transversely of said box and having a body portion defining one of said opposed side walls for engaging the brush, spring means seated at one end against said brush box and at the other end against said plunger to bias the latter inwardly to securely position the brush against lateral and angular movement between said body portion and the opposite side walls, means to regulate the bias of said spring comprising a cap member mounted for adjustment in said box for seating said one end of the spring, and means to engage and bias the brush longitudinally through said box in a direction perpendicular to said side wall bias.

4. In a brush holder for electric machines, an open-ended brush box for receiving a brush for longitudinal sliding movement therein, said box being defined by opposed side walls, a plunger having a shaft snugly mounted in said box for axial sliding movement transversely of said box and having a body portion defining one of said opposed side walls for engaging the brush, spring means seated at one end against said brush box and at the other end against said plunger to bias the latter inwardly to securely position the brush against lateral and angular movement between said body portion and the opposite side walls, a lever pivotally mounted on said plunger operable to engage against the brush box to relieve the bias on said plunger, and means to engage and bias the brush longitudinally through said box in a direction perpendicular to said side wall bias.

5. In a brush holder for electric machines, an open-ended brush box for receiving a brush for longitudinal sliding movement therein, said box being defined by opposed side walls, a plunger having a shaft snugly mounted in said box for axial sliding movement transversely of said box and having a body portion defining one of said opposed side walls for engaging the brush, spring means seated at one end against said brush box and at the other end against said plunger to bias the latter inwardly to securely position the brush against lateral and angular movement between said body portion and the opposite side walls, means to regulate the bias of said spring comprising a cap member mounted for adjustment in said box for seating said one end of the spring, a lever pivotally mounted on said plunger operable to engage against the cap member to relieve the bias on said plunger, and means to engage and bias the brush longitudinally through said box in a direction perpendicular to said side wall bias.

6. For electric machines having a rotary contact member, a brush box and a brush slidably received in said box and adapted upon continued operation of the machine to be displaced longitudinally therethrough, said box being defined by opposed side walls, one of said walls being mounted for lateral movement inwardly of the box, and means to bias said movable wall laterally toward the opposite wall to securely position the brush against lateral and angular movement between said opposed side walls, means to engage and bias said brush longitudinally through said box in a direction perpendicular to said side wall bias and against said rotary contact member, said brush comprising a series of lateral abutting laminations and means interconnecting said laminations to prevent relative longitudinal displacement thereof but affording lateral displacement out of abutting relationship, the bias of said movable wall retaining the laminations in abutting relationship.

7. For electric machines having a rotary contact member, a brush box and a brush slidably received in said box and adapted upon continued operation of the machine to be displaced longitudinally therethrough, said box being defined by opposed side walls, one of said walls being mounted for lateral movement inwardly of the box, and means to bias said movable wall laterally toward the opposite wall to securely position the brush against lateral and angular movement between said opposed side walls, means to engage and bias said brush longitudinally through said box in a direction perpendicular to said side wall bias and against said rotary contact member, said brush including a gage rod projecting longitudinally outward from the trailing end of said brush and being of a length to continuously project from the end of said box as the brush is displaced therethrough, said rod serving both as a means for removing the used brush from said box and as an indicator of the amount of longitudinal movement of the brush through the box.

8. For electric machines having a rotary contact member, a brush box and a brush slidably received in said box and adapted upon continued operation of the machine to be displaced longitudinally therethrough, said box being defined by opposed side walls, one of said walls being mounted for lateral movement inwardly of the box, and means to bias said movable wall laterally toward the opposite wall to securely position the brush against lateral and angular movement between said opposed side walls, means to engage and bias said brush longitudinally through said box in a direction perpendicular to said side wall bias and against said rotary contact member, said brush including a gage rod projecting longitudinally outward from the trailing end of said brush and being of a length to continuously project from the end of said box as the brush is displaced therethrough, said rod serving both as a means for removing the used brush from said box and as an indicator of the amount of longitudinal movement of the brush through the box, said brush comprising a series of lateral abutting laminations and means interconnecting said laminations to prevent relative longitudinal displacement thereof but affording lateral displacement out of abutting relationship, the bias of said movable wall retaining the laminations in abutting relationship.

9. In a brush holder for electric machines, an open ended brush box for receiving a brush for longitudinal sliding movement therein, said box being defined by opposed side walls, one of said walls being mounted for lateral movement inwardly of the box, the other of said walls being defined by an electrically conductive backing plate, means to bias said movable wall towards the opposite wall to securely position the brush against lateral and angular displacement between said opposed side walls, a rotary member mounted on said box and having a foot member to engage the brush, means to bias the foot member longitudinally of the brush to bias the brush through the box in a direction perpendicular to said side wall bias, a lug on said rotary member, and latch means pivotally mounted on said box and operable to be pivotally displaced to engage said lug of the rotary member to latch the member out of engagement with the brush to remove the longitudinal bias on the latter.

References Cited in the file of this patent

UNITED STATES PATENTS

| | | |
|---|---|---|
| 504,901 | Bayles | Sept. 12, 1893 |
| 1,405,497 | Cowen | Feb. 7, 1922 |
| 1,460,152 | Dean | June 26, 1923 |

FOREIGN PATENTS

| | | |
|---|---|---|
| 636,465 | Germany | Oct. 9, 1936 |